US012246959B2

(12) United States Patent
Fantappie et al.

(10) Patent No.: US 12,246,959 B2
(45) Date of Patent: Mar. 11, 2025

(54) BEVERAGE DISPENSING NOZZLE

(71) Applicant: PepsiCo, Inc., Purchase, NY (US)

(72) Inventors: Giancarlo Fantappie, Rancho Palos Verdes, CA (US); Steven T. Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/314,939

(22) Filed: May 7, 2021

(65) Prior Publication Data

US 2021/0347623 A1 Nov. 11, 2021

Related U.S. Application Data

(60) Provisional application No. 63/022,068, filed on May 8, 2020.

(51) Int. Cl.
*B67D 1/00* (2006.01)
*B01F 23/231* (2022.01)
(Continued)

(52) U.S. Cl.
CPC ...... *B67D 1/0042* (2013.01); *B01F 23/23123* (2022.01); *B01F 25/105* (2022.01);
(Continued)

(58) Field of Classification Search
CPC ................ B67D 1/0042; B67D 1/0044; B67D 1/0021; B67D 1/0081; B67D 1/0025;
(Continued)

(56) References Cited

U.S. PATENT DOCUMENTS 1,944,811 A * 1/1934 Rogers, Jr. ............ G07F 13/065 222/377
2,744,738 A * 5/1956 Hjulian .................. E03C 1/084 210/198.1

(Continued)

FOREIGN PATENT DOCUMENTS

WO 2005113411 A2 12/2005

OTHER PUBLICATIONS

International Search Report and Written Opinion of the International Searching Authority in International Application No. PCT/US2021/031375, mailed Aug. 13, 2021 (9 pages).

(Continued)

*Primary Examiner* — Charles P. Cheyney
(74) *Attorney, Agent, or Firm* — Sterne, Kessler, Goldstein & Fox P.L.L.C.

(57) ABSTRACT

A beverage dispensing nozzle includes a housing having an upper end opposite a lower end, and an inlet at the upper end that is configured to be placed in communication with a source of a base liquid. The beverage dispensing nozzle further includes a chamber within the housing and in communication with the inlet. An aerator is in communication with the chamber, and the aerator includes a plate having apertures. A flavor inlet valve is in communication with a source of a flavoring and is arranged downstream of the aerator. The flavor inlet valve is configured to dispense the flavoring into the housing. The beverage dispensing nozzle additionally includes a nozzle tip arranged at the lower end of the housing.

20 Claims, 10 Drawing Sheets

(51) Int. Cl.
*B01F 25/00* (2022.01)
*B01F 35/71* (2022.01)
*B01F 23/237* (2022.01)
*B01F 101/14* (2022.01)

(52) U.S. Cl.
CPC ...... *B01F 35/71805* (2022.01); *B67D 1/0021* (2013.01); *B67D 1/0081* (2013.01); *B01F 23/23761* (2022.01); *B01F 2101/14* (2022.01); *B67D 2001/0094* (2013.01)

(58) Field of Classification Search
CPC ........... B67D 2001/0094; B01F 25/105; B01F 23/23123; B01F 35/71805; B01F 23/23761; B01F 2101/14
USPC ................................ 222/129.1, 129.4, 145.5
See application file for complete search history.

(56) References Cited

U.S. PATENT DOCUMENTS 2,987,221 A 6/1961 Milton
2,993,635 A * 7/1961 Arneson ................ B65D 71/16 206/197
3,575,352 A * 4/1971 Hall ....................... B67D 1/005 239/434.5
3,672,574 A * 6/1972 Knapp .................... E03C 1/084 239/590.3
4,194,650 A * 3/1980 Nottke ................ B01F 15/0416 222/133
5,048,726 A * 9/1991 McCann .............. B67D 1/0044 239/434
5,269,442 A * 12/1993 Vogel ................... B67D 1/0044 239/590.5
5,473,909 A 12/1995 Kateman et al.
5,526,959 A * 6/1996 Green .................. B67D 1/0051 239/553.3
6,173,862 B1 * 1/2001 Buca .................... B67D 1/0043 239/433
6,360,961 B1 * 3/2002 Marazzi ................ B01F 35/833 239/303
7,694,850 B2 4/2010 Guerrero et al.
8,708,252 B2 * 4/2014 Blum .................... B05B 1/3026 239/580
9,386,878 B2 * 7/2016 Midden ............... A47J 31/4485
9,388,033 B2 7/2016 Gates
9,534,361 B2 * 1/2017 Grether ................... E03C 1/084
9,656,849 B2 * 5/2017 Hawken ............... B67D 1/0085
10,071,898 B2 * 9/2018 Zemko ................. B67D 1/0028
10,507,479 B2 * 12/2019 Bertness ................. B01F 33/84
10,582,798 B2 3/2020 Midden et al.
10,697,161 B2 * 6/2020 Birmelin ................. E03C 1/084
10,851,529 B2 * 12/2020 Birmelin ................... E03C 1/08
11,297,850 B2 * 4/2022 Popov .................. B67D 1/1204
11,339,045 B2 * 5/2022 Conway ................. B67D 1/122
2006/0237479 A1 * 10/2006 Fox ...................... B67D 1/0047 222/129.1
2006/0286262 A1 * 12/2006 Stearns ................... A47J 31/41 426/596
2007/0205220 A1 * 9/2007 Rudick .................... B67D 1/07 222/145.6
2007/0205221 A1 * 9/2007 Carpenter ............ B67D 1/0051 222/129.4
2013/0200103 A1 * 8/2013 Gates ....................... B67D 7/74 222/145.5
2014/0048144 A1 * 2/2014 Jaeger .................. B67D 1/0418 137/14
2016/0318746 A1 * 11/2016 Peirsman .............. B01F 23/235
2017/0225936 A1 * 8/2017 Jersey ....................... F25C 5/20
2018/0111815 A1 4/2018 Riel
2020/0031652 A1 * 1/2020 Rudick ................ B67D 1/1231

OTHER PUBLICATIONS

Extended European Search Report in counterpart European Application No. 21800843.1, issued May 10, 2024 (7 pages).

* cited by examiner

BEVERAGE DISPENSING NOZZLE

CROSS-REFERENCE TO RELATED APPLICATION

This application claims the benefit of U.S. Provisional Application No. 63/022,068, filed May 8, 2020, which is incorporated herein by reference in its entirety.

FIELD

Embodiments described herein generally relate to a beverage dispensing nozzle. Specifically, embodiments described herein relate to a beverage dispensing nozzle capable of dispensing multiple types of beverages and that limits or eliminates carryover of flavor.

BACKGROUND

Beverage dispensers can generally be categorized as pre-mix beverage dispensers or post-mix beverage dispensers. In a pre-mix beverage dispenser, the nozzle of the dispenser simply dispenses a pre-prepared, ready-to-drink beverage. Pre-mix beverage dispensers have the drawback of requiring a large reservoir of the pre-mixed, ready-to-serve beverage, which increases the footprint of the beverage dispenser. Further, if it is desired to dispense multiple beverages from the pre-mix beverage dispenser, multiple reservoirs are required which further increases the footprint of the beverage dispenser. As a result, pre-mix dispensers may not be suited for use in small spaces, such as in a home or office setting.

Post-mix beverage dispensers generally dispense a base liquid and a flavoring that combine to form the beverage. As a result, a large reservoir of a pre-mixed beverage is not required, and instead the nozzle of the dispenser can be connected to a source of base liquid and a source of flavoring. This allows for the footprint of the beverage dispenser to be reduced relative to pre-mix beverage dispensers. As the post-mix dispenser dispenses a base liquid and separately a flavoring, the post-mix dispenser may have separate nozzles for each flavoring. The use of multiple nozzles may increase the cost and footprint of the dispenser. If a single nozzle is used for dispensing multiple flavorings, the construction of the nozzle may be relatively complex and may be designed to dispense the base liquid and flavoring in a specific ratio, promote mixing of the base liquid and flavoring, and prevent cross-contamination of the flavorings.

BRIEF SUMMARY OF THE INVENTION

Some embodiments described herein relate to a beverage dispensing nozzle that includes a housing having an upper end opposite a lower end and an inlet at the upper end of the housing that is configured to be placed in communication with a source of a base liquid. The beverage dispensing nozzle includes a chamber within the housing that is in communication with the inlet, and an aerator in communication with the chamber, wherein the aerator comprises a plate having a plurality of apertures. The beverage dispensing nozzle further includes a flavor inlet valve in communication with a source of a flavoring that is arranged downstream of the aerator, wherein the flavor inlet valve is configured to dispense the flavoring into the housing, and a nozzle tip arranged at the lower end of the housing.

Some embodiments described herein relate to a beverage dispensing nozzle that includes a housing having an inlet at an upper end of the housing that is in communication with a source of a base liquid and an aerator arranged within the housing configured to reduce a pressure of a flow of the base liquid. The beverage dispensing nozzle further includes a flavor inlet valve configured to dispense a flavoring into the housing downstream of the aerator, wherein a dilution ratio of flavoring to the base liquid is in a range of 1:20 to 1:1000, and a nozzle tip arranged at a lower end of the housing for dispensing the base liquid and the flavoring.

Some embodiments described herein relate to beverage dispensing nozzle that includes a housing having an inlet for receiving a flow of a base liquid, and an aerator arranged within the housing and configured to reduce a pressure of the flow of the base liquid. The beverage dispensing nozzle further includes a flavor inlet valve arranged downstream of the aerator, wherein the flavor inlet valve comprises a poppet having a head, wherein the head of the poppet extends from an inner wall of the housing so that the head of the poppet is in the flow of the base liquid, wherein the flavor inlet valve is configured to be placed in communication with a source of flavoring and selectively dispense the flavoring into the housing, and a nozzle tip arranged at a lower end of the housing for dispensing the base liquid and the flavoring.

In any of the various embodiments discussed herein, the flavor inlet valve may include a poppet valve. In some embodiments, the poppet valve may include a poppet having a head that extends from an inner wall of the housing.

In any of the various embodiments discussed herein, the beverage dispensing nozzle may further include a nozzle head defining the inlet.

In any of the various embodiments discussed herein, the flavor inlet valve may be one of a plurality of flavor inlet valves. In some embodiments, the plurality of flavor inlet valves may be arranged around a circumference of the housing. In some embodiments, the plurality of flavor inlet valves may be radially arranged around the housing. In some embodiments, the plurality of flavor inlet valves may be arranged in a common plane.

In any of the various embodiments discussed herein, the flavor inlet valve may be configured to dispense the flavoring into the housing in a direction perpendicular to a longitudinal axis of the housing.

In any of the various embodiments discussed herein, the nozzle tip may be removably secured to the housing.

In any of the various embodiments discussed herein, the dilution ratio may be in a range of 1:100 to 1:900

In any of the various embodiments discussed herein, the aerator may include one or more plates each having a plurality of apertures. In some embodiments, a top plate of the one or more plates may have a conical shape with an apex.

In any of the various embodiments discussed herein, the flavor inlet valve may be configured to dispense the flavoring into the flow of the base liquid.

In any of the various embodiments discussed herein, the beverage dispensing nozzle may further include a chamber in communication with the inlet. In some embodiments, the chamber may retain a quantity of the base liquid to prevent backflow of air into the chamber.

In any of the various embodiments discussed herein, the poppet may include a biasing mechanism configured to bias the flavor inlet valve in a closed configuration.

In any of the various embodiments discussed herein, the flavor inlet valve may include a first section configured to be placed in communication with the source of the flavoring, and a second section connected to the housing such that the second section is perpendicular to a longitudinal axis of the housing.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
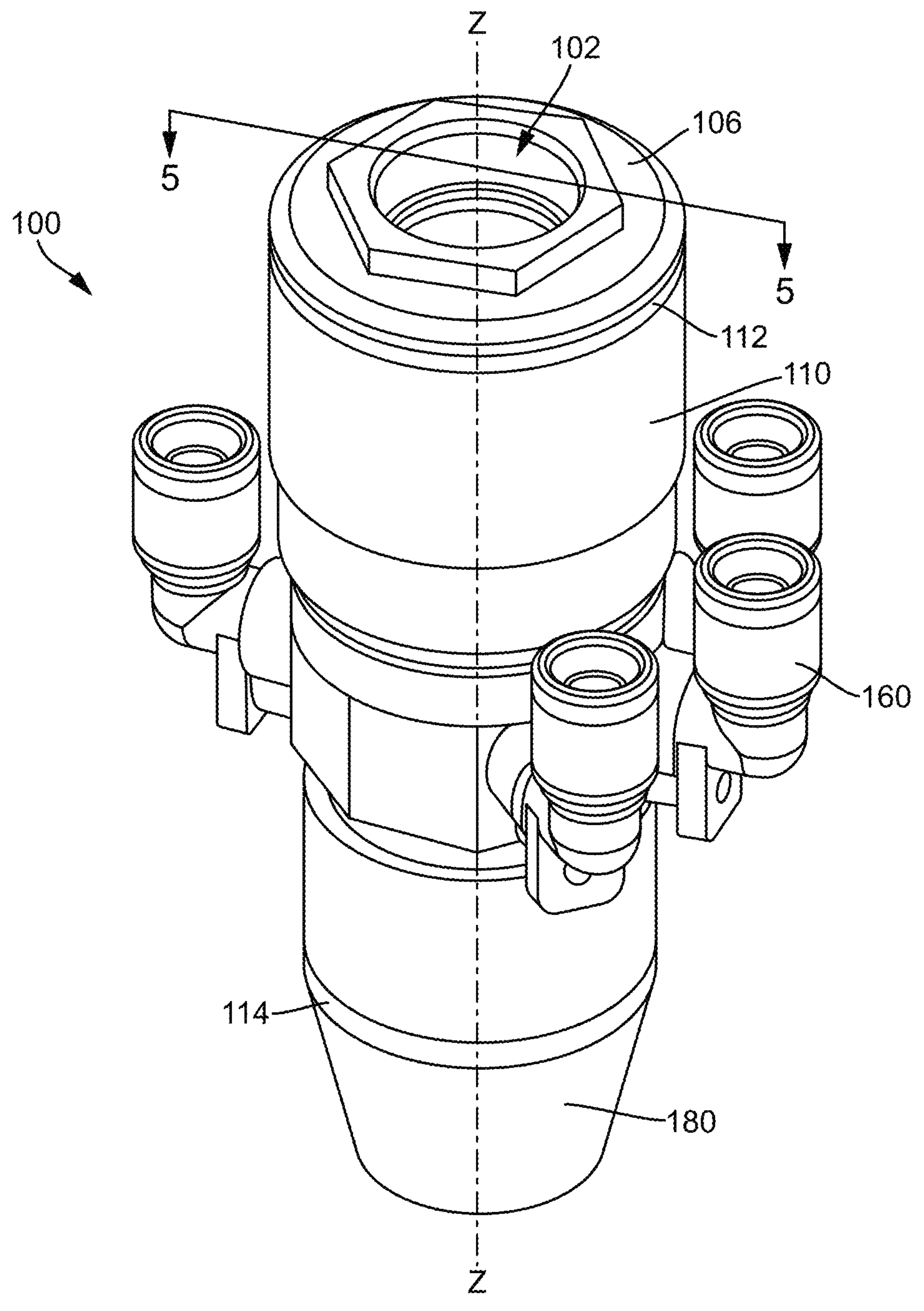
FIG. 1 shows a perspective view of a beverage dispensing nozzle according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Post-mix beverage dispensing nozzles dispense a base liquid and a flavoring so that the base liquid and flavoring combine to form a beverage. Post-mix beverage dispensing nozzles may be configured to dispense several types of flavoring so that the nozzle can dispense various beverages by dispensing the base liquid and a selected flavoring.

As the post-mix dispensers may dispense multiple flavors, post-mix beverage dispensing nozzles may suffer from carryover of flavor. After dispensing a first beverage from the nozzle, traces of flavoring from the first beverage may remain within the nozzle. When the next beverage is dispensed, the beverage may contain traces of flavoring from the first beverage. This may result in off-tastes, which is undesirable. This may be particularly noticeable when the next beverage dispensed is water or carbonated water.

In order to avoid carryover of flavor, some post-mix dispensing nozzles may be configured to separately dispense base liquid and flavoring so that no mixing occurs within the nozzle. Instead, mixing may occur within the container receiving the dispensed beverage or mixing may occur in-flight, i.e., on the way to the container. However, dispensing flavoring separately from the base liquid may provide an unappealing appearance as consumers may prefer to not view the flavoring being dispensed. Further, mixing of the flavoring and base liquid in the container may be incomplete. Beverage dispensing nozzles generally dispense flavoring and base liquid in a dilution ratio of flavoring to base liquid in a range of 1:4 to 1:10, and thus a fairly large amount of flavoring flows through the nozzle for combination with the base liquid. Generally, as the dilution ratio increases (such that the flavoring is more diluted), carryover of flavor increases. Post-mix beverage dispensing nozzles may be specifically designed to promote mixing of the flavoring and the base liquid. For example, some post mix nozzles may include structures, such as flow channels to cause cross flow or swirling of the base liquid or flavoring to promote mixing. However, by flowing flavoring through the nozzle, the likelihood of carryover of flavor is increased.

Thus, a beverage dispensing nozzle is desired that provides a visually appealing flow of the dispensed beverage without separation of the base liquid and flavoring flow streams, that provides adequate mixing of the base liquid and flavoring, and that minimizes or eliminates carryover of flavor.

Some embodiments described herein relate to a beverage dispensing nozzle that dispenses flavoring in a high dilution ratio with the base liquid so as to minimize carryover of flavor and promote mixing of the flavoring and base liquid. As a result, a relatively small amount of flavoring flows through the nozzle, and structures that promote mixing of streams of base liquid and flavoring are not required. Some embodiments described herein relate to a beverage dispensing nozzle that dispenses flavoring from flavor inlet valves that extend into a flow path of the base liquid within the nozzle housing so that the base liquid rinses the flavor inlet valves and the flavoring is dispensed directly into the flowing base liquid. This helps to prevent carryover of flavor by rinsing flavoring remaining on the valve flavor inlet valve head and flavoring does not contact an inner wall of housing which helps to prevent carryover of flavor.

While the present application may refer to the beverage dispensing nozzle being used to dispense water, it is understood that other base liquids can be dispensed via the nozzle, such as carbonated water, water at different temperatures, water at different pH levels, or dairy-based liquids, among others.

As used herein, flavoring may refer to a particular flavor, such as cola, grape, orange, lemon-lime, cherry, or vanilla, among others, or may refer to a beverage ingredient, such as an enhancer (e.g., multi-vitamin complexes, minerals, and energy boosters), sweetener, or coloring, whether in the form of a liquid, syrup, or concentrate, or other form.

As used herein, base liquid may refer to any free-flowing consumable liquid, such as water, carbonated water, or dairy-based beverages, such as milk, among others.

As used herein, a beverage may refer to a base liquid alone or in combination with one or more flavorings.

Some embodiments described herein relate to a beverage dispensing nozzle as shown in FIG. 1. Beverage dispensing nozzle 100 includes a housing 110 having an upper end 112 opposite a lower end 114. Housing 110 may have a tubular shape and may be cylindrical. Housing 110 may have a longitudinal axis Z extending in a direction of upper end 112 of housing 110 to lower end 114. Housing 110 may define an inlet 102 at upper end 112 of housing 110. Inlet 102 is configured to be connected to a source of a base liquid, such as by a conduit. The source of base liquid may be a municipal water supply, a well, or a reservoir of base liquid, among others. Nozzle 100 may further include one or more flavor inlet valves 160 for selectively dispensing a flavoring into an interior volume of housing 110. Flavor inlet valves 160 are each configured to be connected to a source of a flavoring, such as by a conduit. In some embodiments, flavor inlet valves 160 may be poppet valves, as described in further detail below. Further, a nozzle tip 180 may be arranged at lower end 114 of housing 110 for dispensing the base liquid and the flavoring from the nozzle 100 into a container, such as a cup.

Figure 2:
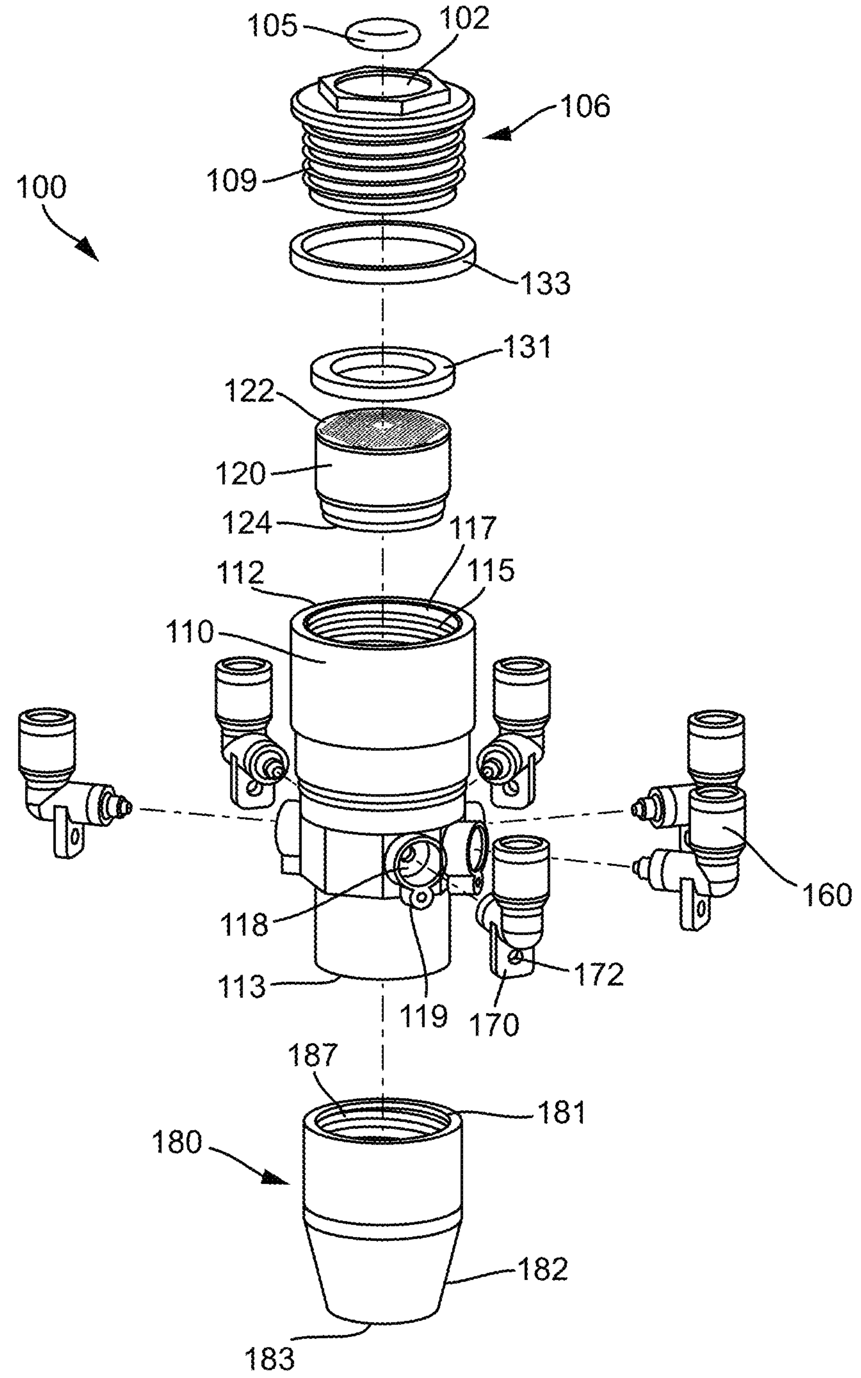
FIG. 2 shows an exploded view of the beverage dispensing nozzle of FIG. 1.

In some embodiments, nozzle 100 may include a nozzle head 106 that defines inlet 102, as shown in FIG. 2. Nozzle head 106 may be secured at upper end 112 of housing 110. Head 106 may include a seal 105, such as an O-ring, around inlet 102 for creating a liquid-tight seal with a conduit connected to inlet 102. Head 106 may be secured to housing 110 via a threaded connection. For example, head 106 may have external threading 109 configured to engage with threading 115 on an inner wall 117 of upper end 112 of housing 110. However, in some embodiments, head 106 may be integrally formed with housing 110, or head 106 may be permanently secured to housing 110 via welding, bonding, or braising, among other fastening methods. A seal 133, such as an O-ring, may be arranged around an exterior of head 106 to create a liquid tight seal with housing 110 to prevent liquid from escaping nozzle 100 when head 106 is engaged with housing 110.

Nozzle 100 may further include an aerator 120, as shown in FIG. 2. Aerator 120, which may also be referred to as a flow compensator, may be arranged within an interior volume of housing 110 so that flow of base liquid through inlet 102 is directed toward aerator 120. In some embodiments, inlet 102 may be in communication with a chamber that is in communication with aerator 120, as discussed in detail below. Aerator 120 may be configured to reduce a pressure of base liquid flowing into nozzle 100 from the source of base liquid. Flow of base liquid into nozzle 100 from the source of base liquid may be, for example, at a pressure of 100 psi or more, and aerator 120 may reduce pressure to atmospheric pressure, e.g., about 15 psi. Further, base liquid flowing into nozzle 100 may be highly turbulent, and aerator 120 may change the flow to laminar flow. In this way, aerator 120 may provide a smooth and uniform flow of base liquid through the housing 110.

Housing 110 of nozzle 100 may include valve openings 118 for receiving flavor inlet valves 160 so that each flavor inlet valve 160 is in communication with an interior volume of housing 110. Valve openings 118 may be arranged on housing 110 between upper end 112 and lower end 114, and may be arranged at a mid-portion of housing 110 downstream of aerator 120. In this way, flavoring may be dispensed from flavor inlet valve 160 into an interior volume of housing 110 to combine with base liquid at a location downstream of aerator 120.

Nozzle 100 further includes a nozzle tip 180 arranged at lower end 114 of housing 110. A beverage is dispensed from beverage dispensing nozzle 100 via an outlet 183 defined by nozzle tip 180. Nozzle 100 may have an upper end 181 opposite a lower end 182. Nozzle tip 180 may taper from upper end 181 toward lower end 182. In some embodiments, nozzle tip 180 may have a conical shape. Nozzle tip 180 may be removably securable to housing 110 to facilitate cleaning and replacement of nozzle tip 180, and cleaning of interior of housing 110. Specifically, upper end 181 of nozzle tip 180 may be removably secured to a lower end 114 of housing 110. Nozzle tip 180 may be removably secured to housing 110, such as by threading 187. In some embodiments, nozzle tip 180 may be secured via male and female connectors, bayonet connectors, press fit, or snap fit, among other fastening methods.

Figure 3:
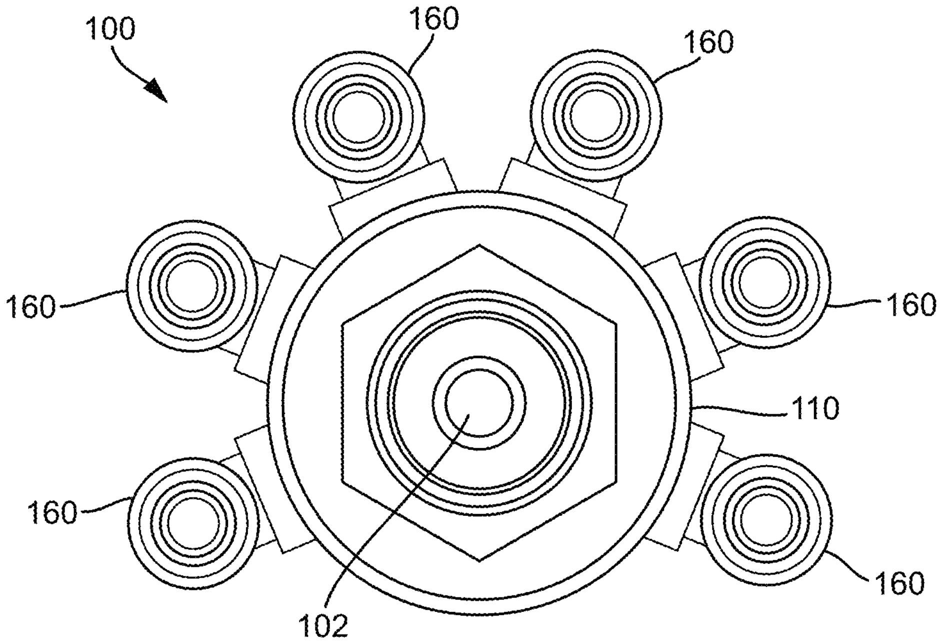
FIG. 3 shows a top down view of the beverage dispensing nozzle of FIG. 1.

In some embodiments, housing 110 may have a circular cross sectional area as shown in FIG. 3. Inlet 102 for connection to a source of base liquid may be centrally arranged on housing 110. In some embodiments, nozzle 100 may include more than one inlet 102 for receiving different types of base liquids. For example, in some embodiments, two inlets 102 may be used to provide a flow of water and a flow of carbonated water into nozzle 100.

Flavor inlet valves 160 may be arranged around a circumference of housing 110, as shown for example in FIG. 3. Flavor inlet valves 160 may be radially arranged around housing 110. Flavor inlet valves 160 may be spaced from one another at a fixed interval. While nozzle 100 of FIG. 3 is shown as having six flavor inlet valves 160, in other embodiments, nozzle 100 may include fewer or additional flavor inlet valves 160. Each flavor inlet valve 160 may be connected to a different source of flavoring to allow nozzle 100 to dispense various types of beverages. However, in some embodiments, one or more flavor inlet valves 160 may be connected to the same type of source of flavoring in order to provide additional capacity. In some embodiments, flavor inlet valve 160 may dispense an alkaline water diluted flavoring into housing 110 of nozzle 100.

Figure 4:
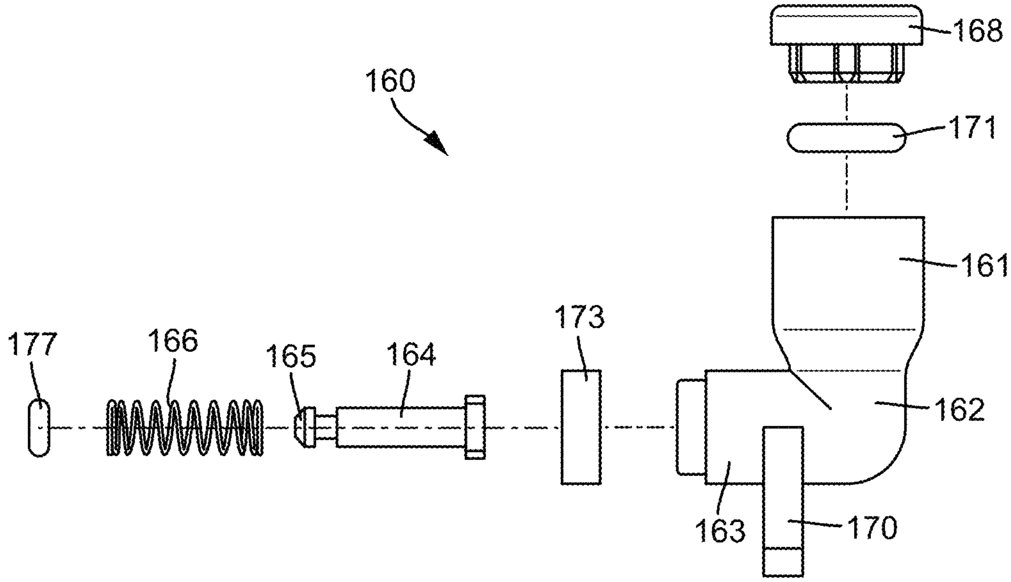
FIG. 4 shows an exploded view of a flavor inlet valve of the beverage dispensing nozzle of FIG. 1.

In some embodiments, flavor inlet valve 160 may be a poppet valve as shown in FIG. 4. Each flavor inlet valve 160 may include a valve housing 162. Valve housing 162 may have a tubular structure and may include a first section 161 and a second section 163 arranged at an angle to one another. First section 161 may be arranged perpendicularly to second section 163, such that valve housing 162 has an L-shape or elbow shape. However, in some embodiments, valve housing 162 may be linear, or may have an angle other than 90 degrees, such as 45 degrees, among other angles. When flavor inlet valve 160 is secured to housing 110 of nozzle 100, first section 161 of valve housing 162 may be arranged in a vertical orientation substantially parallel to a longitudinal axis Z of nozzle 100 (see, e.g., FIG. 1), and second section 163 may be arranged transversely to longitudinal axis Z of nozzle 100. First section 161 of flavor inlet valve 160 may include a seal 171, such as an O-ring, to provide a liquid-tight connection with a conduit connected to a source of flavoring. Further, first section 161 of valve housing 162 may include a collet 168 for engaging the conduit.

Second section 163 of valve housing 162 may be seated in a valve opening 118 of housing 110 (see, e.g., FIG. 2). Second section 163 may include a seal 173, such as an O-ring, for providing a liquid-tight seal between housing 110 and flavor inlet valve 160. Each flavor inlet valve 160 may be secured to housing 110 via one or more mechanical fasteners (see, e.g., FIG. 5). Each flavor inlet valve 160 may include a tab 170 extending from valve housing 162. Tab 170 may define an aperture 172 for receiving a mechanical fastener 169, such as a screw. Aperture 172 of tab 170 may be configured to align with an aperture 119 of housing 110 adjacent valve opening 118 so that fastener 169 extends through aperture 172 of tab 170 and into aperture 119 of housing 110 to secure valve 160 to housing 110. However, in some embodiments, flavor inlet valve 160 may be secured to housing 110 via alternate fastening methods. For example, in some embodiments, flavor inlet valve 160 may be integrally formed with housing 110, or may be permanently fastened to valve housing 162 such as via welding, braising, or bonding, among other fastening methods.

A poppet 164 having a head 165 may be arranged within second section 163 of flavor inlet valve 160 for controlling the flow of flavoring through second section 163 and into housing 110. In a closed configuration, head 165 of poppet 164 prevents flavoring from flowing through valve body 162 into housing 110. In an open configuration, poppet 164 extends toward housing 110 so that head 165 extends further into interior volume of housing 110, allowing flavoring to flow through second section 163 of valve body 162 and into housing 110. In some embodiments, head 165 of poppet 164 may have a rounded shape, such as a dome shape or may have a convex curvature to promote uninterrupted flow of base liquid in housing 110 over and around head 165. Poppet 164 may be biased in the closed configuration by a biasing mechanism 166. In some embodiments, as shown in FIG. 4, biasing mechanism 166 may be a spring, and spring may arranged around an exterior of poppet 164. Poppet 164 may further include a seal 177 at or adjacent head 165 for providing a liquid-tight seal with an inner wall 117 of housing 110 when flavor inlet valve 160 is in the closed configuration in order to prevent flavoring from leaking into interior volume of housing 110, and prevent external air from entering the flavor inlet valve 160. Poppet 164 may be actuated by any of various actuators or actuation methods known in the art, such as by a mixture of carbon dioxide gas and flavoring driven through flavor inlet valve 160 by a pump, such as a peristaltic pump, to overcome the biasing force of the biasing mechanism 166.

Housing 110, nozzle tip 180, head 106, and housing 162 of flavor inlet valve 160 may be formed from a metal, such as stainless steel. However, in some embodiments, one or more components of nozzle 100 may be composed of a hard plastic, such as polyvinyl chloride (PVC), among others. Any of the various seals 105, 131, 133, 171, 173, 177 described herein may be formed from an elastomer, such as ethylene propylene diene monomer rubber (EPDM), nitrile rubber (NBR), acrylonitrile butadiene styrene (ABS), silicone, polycarbonate, nylon, polypropylene, polyoxymethylene (acetal), polyetheretherketone (PEEK), or a fluoroelastomer, among others.

Figure 5:
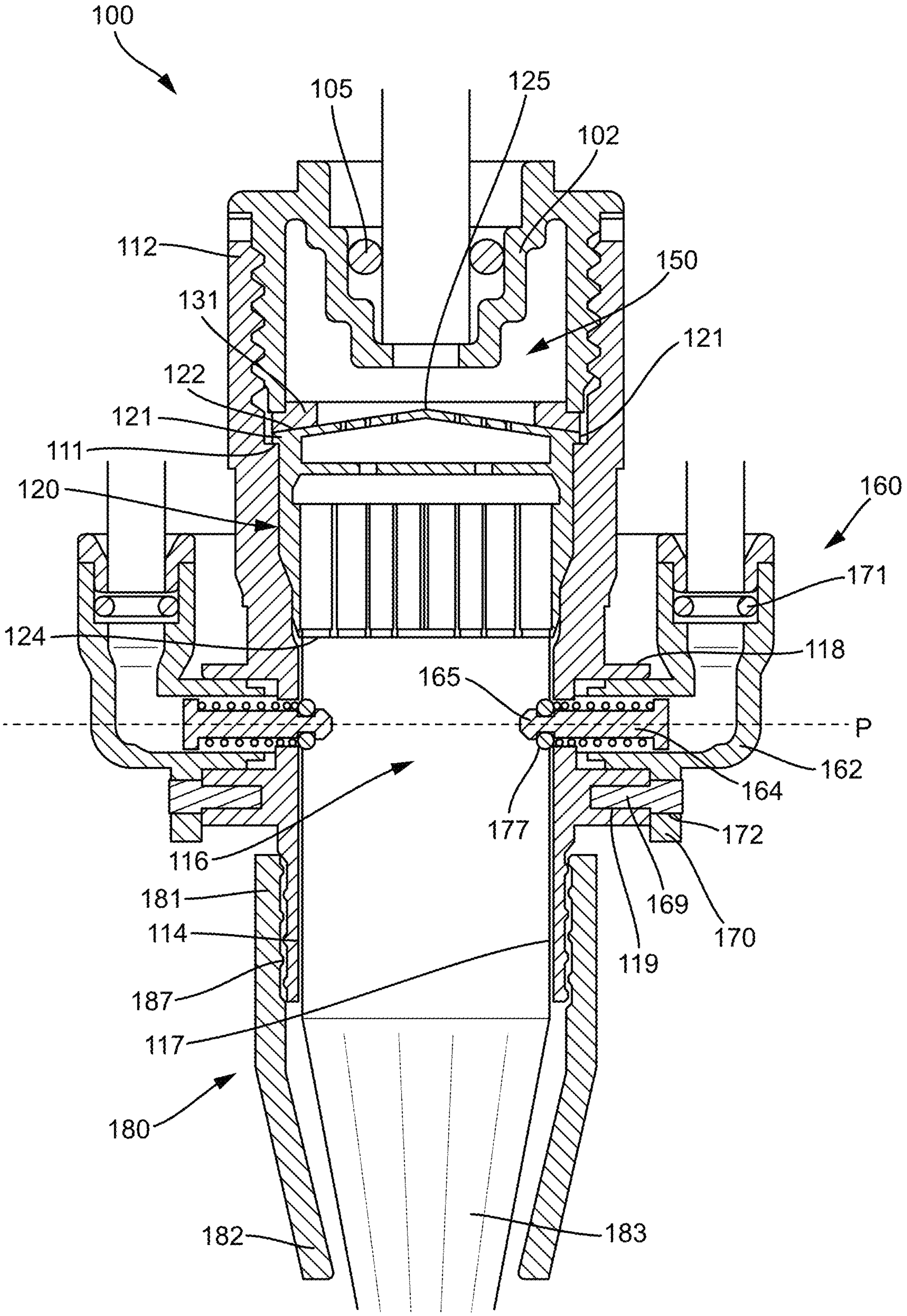
FIG. 5 shows cross sectional view of the beverage dispensing nozzle of FIG. 1 taken along line 5-5 of FIG. 1.

In some embodiments, nozzle 100 may define an expansion chamber 150 at upper end 112 of housing 110 of nozzle 100, as shown in FIG. 5. Expansion chamber 150 may be a volume within housing 110 defined by head 106 and aerator 120. As base liquid enters nozzle 100 via inlet 102, base liquid flows into and at least partially fills expansion chamber 150. As base liquid may be supplied to nozzle 100 at high pressure (e.g., 100 psi or more), such as via a water delivery or booster pump, expansion chamber 150 may help to reduce the pressure of the base liquid flowing into nozzle 100. Expansion chamber 150 may have a diameter that is greater than a diameter of inlet 102 to provide space for the base liquid to flow and to reduce the speed of the flow of base liquid. In operation of nozzle 100, expansion chamber 150 is configured to reduce the speed of the flow of base liquid and further to retain an amount of base liquid, at any time, so as to prevent backflow of air into nozzle 100 when nozzle 100 is not in use. Expansion chamber 150 may help to prevent turbulent flow of base liquid through nozzle 100.

As discussed, nozzle 100 may include an aerator 120, as shown for example in FIG. 5. Aerator 120 may be seated within an interior volume of housing 110. Aerator 120 may include a peripheral lip 121 that engages with an interior ridge 111 on an inner wall 117 of housing 110 to securely position aerator 120 within housing 110. Further, a seal 131, such as an O-ring, may be arranged at upper end 122 of aerator 120 to prevent flow of base liquid around aerator 120, such as along inner wall 117 of housing 110. Seal 131 also helps to prevent flow of air around aerator 120 and into expansion chamber 150 and conduits supplying base liquid to nozzle 100. Flow of air around aerator 120 is undesirable and may lead to dripping from nozzle 100 after a beverage is dispensed from nozzle 100.

In some embodiments, aerator 120 may have an upper end 122 opposite a lower end 124, such that when aerator 120 is installed in nozzle 100, base liquid flows in a direction from upper end 122 toward lower end 124. Aerator 120 may include one or more plates each having a plurality of apertures or flow channels through which base liquid may flow for restricting or controlling a flow of the base liquid. In some embodiments, aerator 120 includes a top plate 127, a main plate 128, and a lower plate 129, as shown in FIGS. 6A, 6B, 6C, and 7. However, in some embodiments, aerator 120 may include fewer or additional plates. Aerator 120 may have a unitary construction, or plates 127, 128, 129 may be separate components.

Figure 6A:
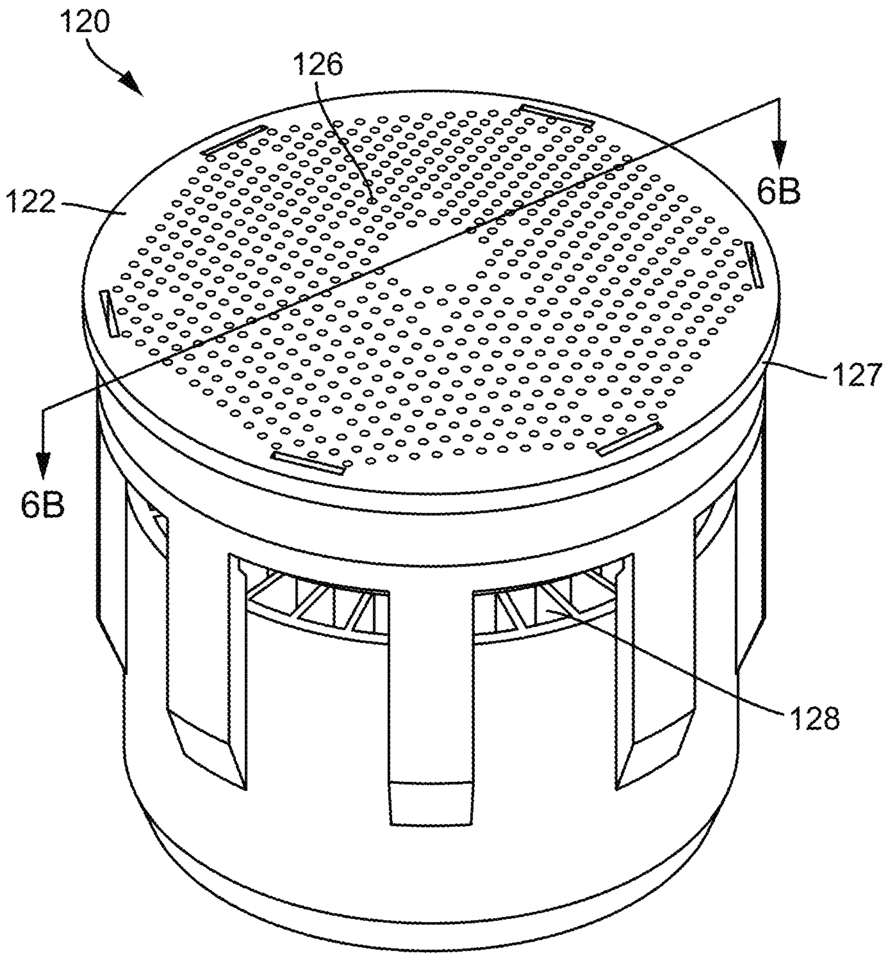
FIG. 6A shows a perspective view of an aerator for a beverage dispensing nozzle according to an embodiment.
Figure 6B:
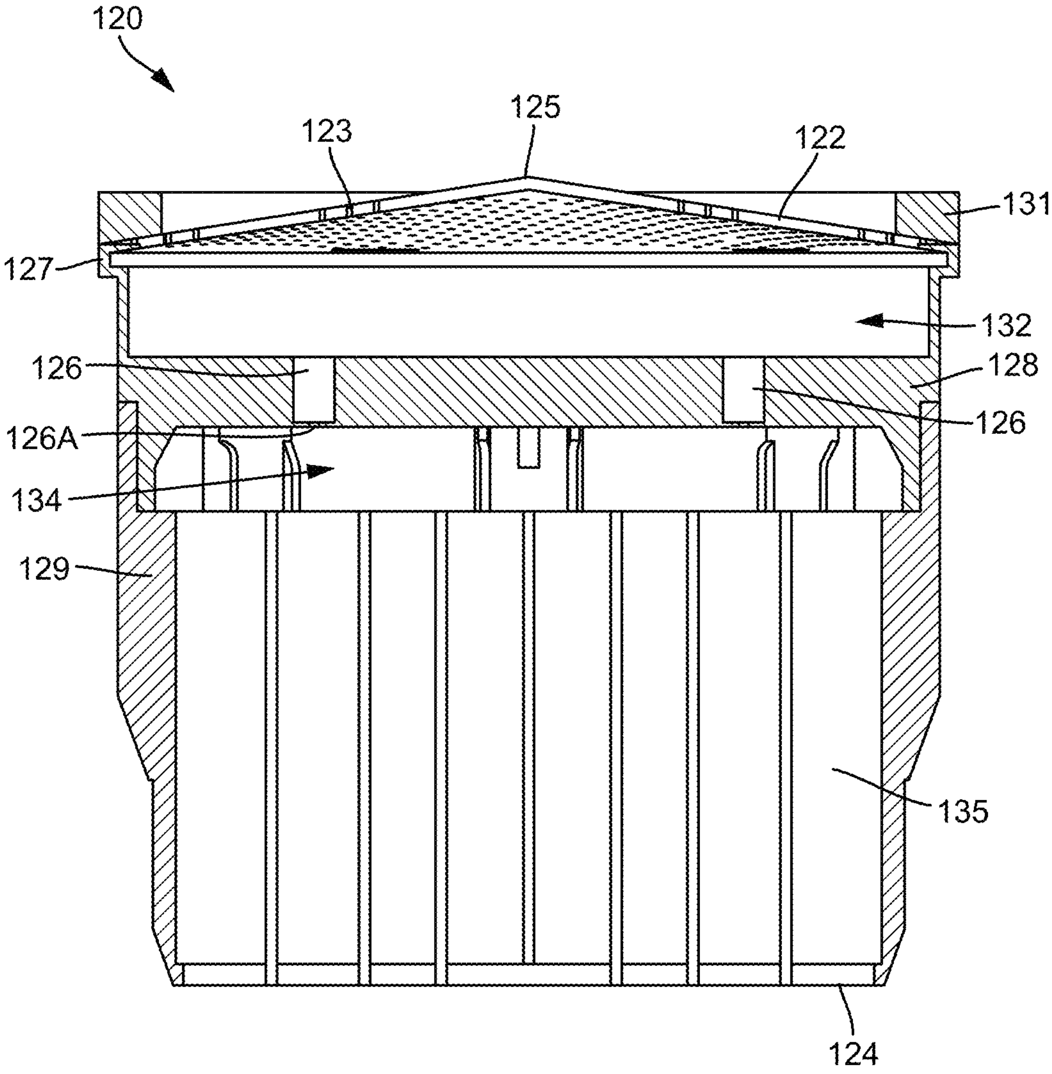
FIG. 6B shows a cross sectional view of the aerator of FIG. 6A taken along line 6B-6B in FIG. 6A.
Figure 6C:
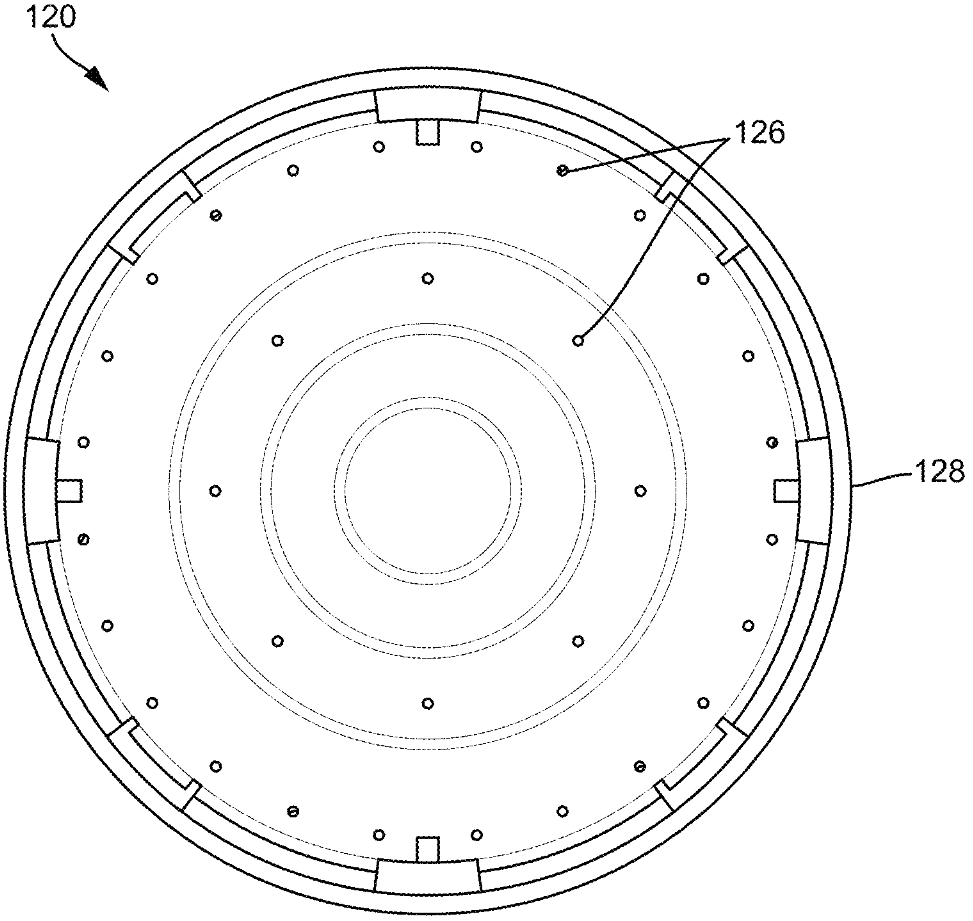
FIG. 6C shows a bottom view of a main plate of the aerator of FIG. 6A.

Base liquid flowing into nozzle 100 may be turbulent and may be at a high pressure, and aerator 120 is configured to reduce a pressure of the base liquid and provide laminar or quasi-laminar flow of the base liquid. Aerator 120 may be configured to reduce or eliminate splashing of base liquid so as to prevent loss of carbonation of a carbonated base liquid. In order to reduce pressure of the base liquid and provide laminar flow without splashing, aerator 120 includes a main plate 128, as shown in FIG. 6B. Main plate 128 includes a plurality of apertures 126. In some embodiments, apertures 126 may be tapered at an outlet 126A. The size and number of apertures 126 may be selected to provide a desired flow rate of base liquid through a remainder of the nozzle. For example, the main plate 128 may be configured to provide a base liquid flow rate of 0.5 gallons per minute to 1.2 gallons per minute. Apertures 126 are a relatively small diameter to restrict the flow of base liquid, and in some embodiments apertures 126 may have a diameter of 0.01 mm to 1 mm. As the diameter of the apertures 126 increases, the ability to reduce pressure of the base liquid while maintaining carbonation may be negatively impacted. Further, a number of apertures may be low relative to top plate 127 or lower plate 129, and in some embodiments, main plate 128 may include 10 to 100 apertures, 15 to 60 apertures, or 20 to 45 apertures. In order to provide a higher flow rate (e.g., above 1.2 gallons per minute), more apertures 126 may be included, and to provide a lower flow rate (e.g., below 0.5 gallons per minute), fewer apertures 126 may be included.

In some embodiments, aerator 120 includes a top plate 127 at upper end 122 of aerator that is arranged above main plate 128 and is separated therefrom by a chamber 132. Top plate 127 may be configured to retain a quantity of base liquid above top plate 127 in expansion chamber 150 (see, e.g., FIG. 5) after a beverage is dispensed in order to avoid back flow of air into expansion chamber and base liquid supply line. Top plate 127 may have a plurality of apertures 123 so that base liquid may flow through top plate 127 and into chamber 132. Top plate 123 may have a large number of apertures relative to main plate 128. In some embodiments, top plate 127 may be sloped and may have a conical shape, with a centrally arranged apex 125. The conical shape helps to allow a quantity of base liquid to remain in the expansion chamber 150 after a beverage is dispensed from nozzle 100. Apertures 123 may be distributed throughout top plate 123, however, apex 125 may not include apertures 123 in order to prevent lowering of the level of base liquid retained above top plate 127 in expansion chamber 150. Apertures 123 have a diameter that is sufficiently small so that surface tension of the base liquid prevents the base liquid from passing through apertures 123 after a dispensing operation. In some embodiments, top plate 127 may have a mesh size of 50 to 200 mesh.

Figure 7:
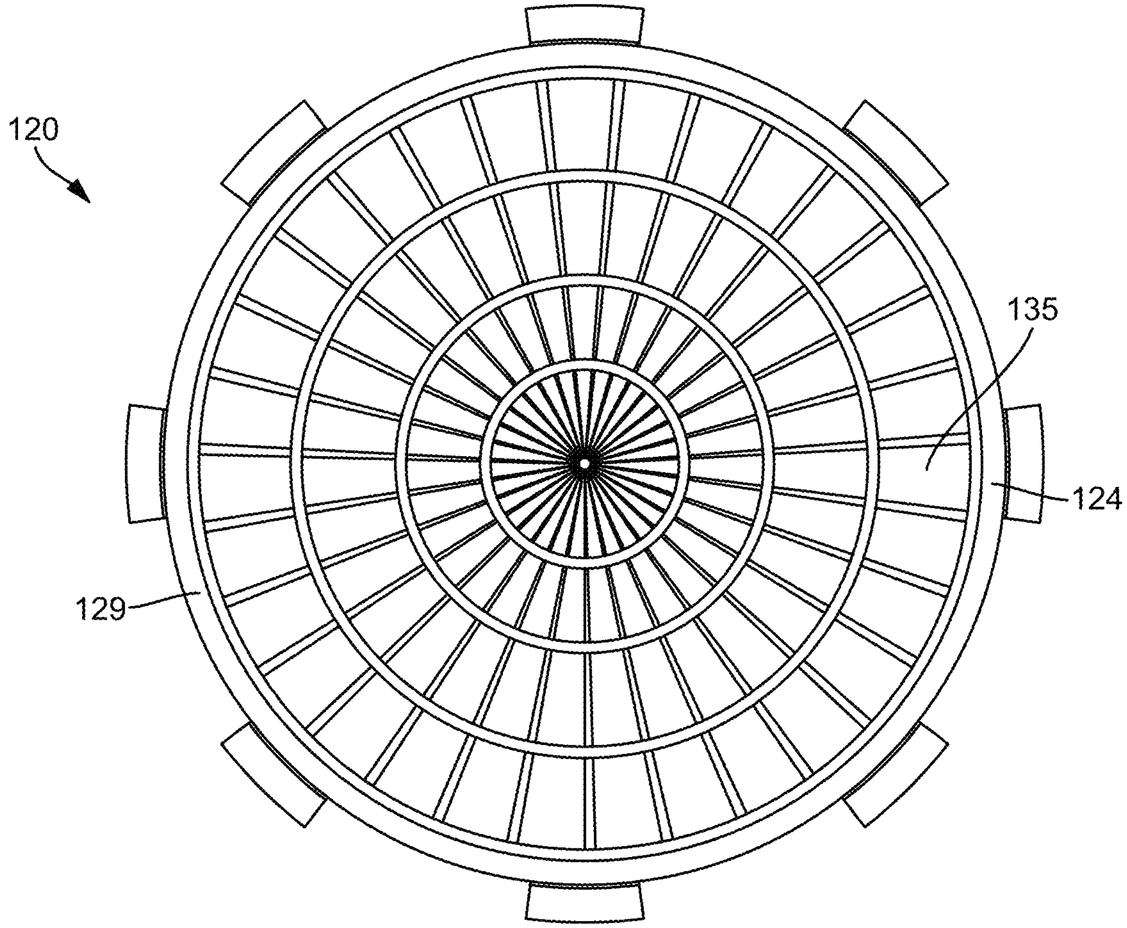
FIG. 7 shows a bottom view of the aerator of FIG. 6A.

A lower plate 129 may be arranged below main plate 128 at a lower end 124 of the aerator. Lower plate 129 may be separated from main plate 128 by a second chamber 134. Lower plate 129 may have a plurality of apertures 135 to allow base liquid to pass from second chamber 134 through third plate 129 and out of aerator 120, as best shown in FIG. 7. Apertures 135 may be large in size in comparison to first and second pluralities of apertures 123, 126 to allow base liquid to flow freely through lower plate 129 and out from aerator to provide a smooth flow of base liquid through a remainder of nozzle 100.

In operation of aerator 120, base liquid flows through apertures 123 of top plate 127 and into a chamber 132 below top plate 127. A quantity of base liquid may remain above top plate 127 after the dispensing operation is complete. Base liquid passes through apertures 126 of main plate 128 and into second chamber 134, wherein main plate 128 restricts the flow of base liquid and reduces the pressure of the base liquid. Base liquid flows from second chamber 134 through apertures 135 of lower plate 129 to provide a smooth flow of base liquid out of aerator 120.

Figure 8:
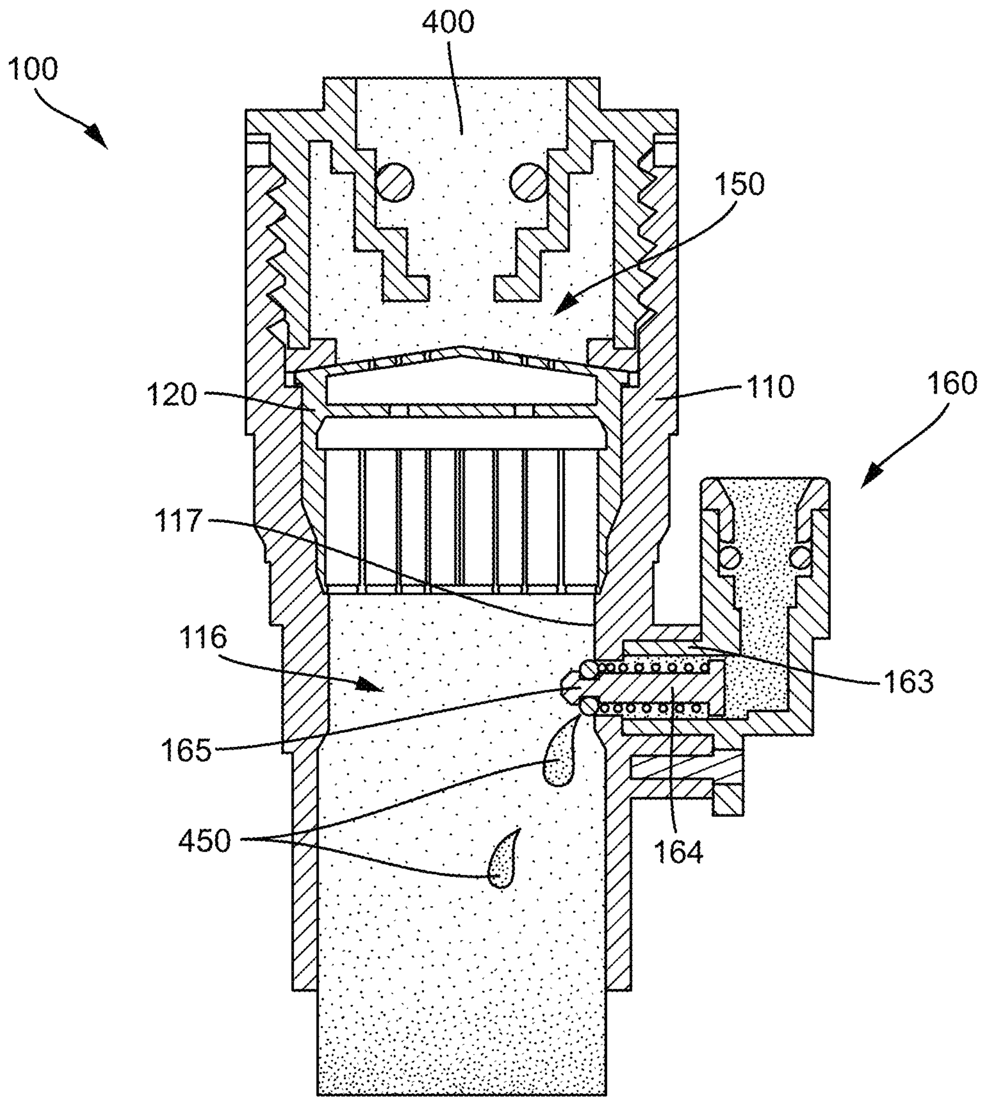
FIG. 8 shows a cross sectional view of a beverage dispensing nozzle in operation to dispense a base liquid and a flavoring according to an embodiment.

In operation of nozzle 100, base liquid 400 flows into nozzle 100 via inlet 102 and into chamber 150, as shown in FIG. 8. Base liquid 400 flows through aerator 120 to reduce the pressure of the base liquid and provide a smooth, laminar flow of base liquid through a remainder of housing 110. While base liquid 400 flows through housing 110, flavor inlet valve 160 may dispense a predetermined quantity of flavoring 450 into the flow of base liquid downstream of aerator 120. In some embodiments, flavoring and base liquid are dispensed such that a dilution ratio of flavoring to base liquid is in a range of 1:20 to 1:1000, 1:100 to 1:900, or 1:200 to 1:800. Flavoring may be highly concentrated so that a beverage having the desired taste can be produced using only a small amount of flavoring. The relatively high dilution ratio allows for a small volume of flavoring to be dispensed into nozzle 100 relative to the amount of base liquid flowing through nozzle 100.

Flavoring 450 may be dispensed by flavor inlet valves 160 into the flow of base liquid within housing 110. If the flavoring flows along an inner wall 117 of housing 110, rinsing the flavoring from the housing 110 may be more difficult, and carryover of flavor may be more likely to occur. In order to prevent flavoring from contacting an inner wall 117 of housing 110, flavor inlet valve 160 extends inward from inner wall 117 into a flow path of base liquid, as shown in FIG. 8. Specifically, head 165 of poppet 164 of each flavor inlet valve 160 extends inward from inner wall 117 of housing 110 into an interior volume of housing 110 and into the flowing base liquid 400. This geometry helps to allow flavoring 450 to avoid contacting an inner wall 117 of housing 110 to reduce carryover of flavor. Flavoring 450 does not flow along an inner wall 117 of housing 110 and is instead dispensed into the flowing base liquid 400. Further, as base liquid 400 flows through housing 110, base liquid rinses head 165 of each flavor inlet valve 160 to remove any flavoring thereon.

As second section 163 of flavor inlet valve 160 may be arranged generally perpendicular to a longitudinal axis Z of nozzle 100, flavoring 450 is directed away from inner wall 117 and is instead dispensed into an interior volume of housing 110 in a direction perpendicular to the longitudinal axis Z. This helps to prevent flavoring 450 from contacting inner wall 117 of housing 110, and further promotes mixing of base liquid 400 and flavoring 450. Further, flavor inlet valves 160 may be arranged in a common plane P (see, e.g., FIG. 5), so that flavoring dispensed from one flavor inlet valve 160 does not flow over another flavor inlet valve 160.

Mixing of flavoring 450 and base liquid 400 may begin within nozzle 100 as flavoring is dispensed directly into a flow of base liquid 400. As flavoring 450 is dispensed into housing 110 in a relatively small volume, housing 110 may not have internal structures to direct flow of base liquid or to promote mixing of base liquid and flavoring. As a result, housing 110 does not interrupt the flow of base liquid 400, which helps to prevent turbulence. When base liquid 400 is a carbonated liquid, turbulence may result in loss of carbonation which is undesirable. While head 165 of poppet 164 extends from inner wall 117 of housing 110, head 165 of poppet 164 of flavor inlet valve 160 does not disrupt the flow of base liquid 400 or generate turbulence. Head 165 may have a convex shape or dome-shape to further promote smooth flow of base liquid 400 around head 165 of flavor inlet valve 160 and avoid creating turbulent flow.

Figure 9:
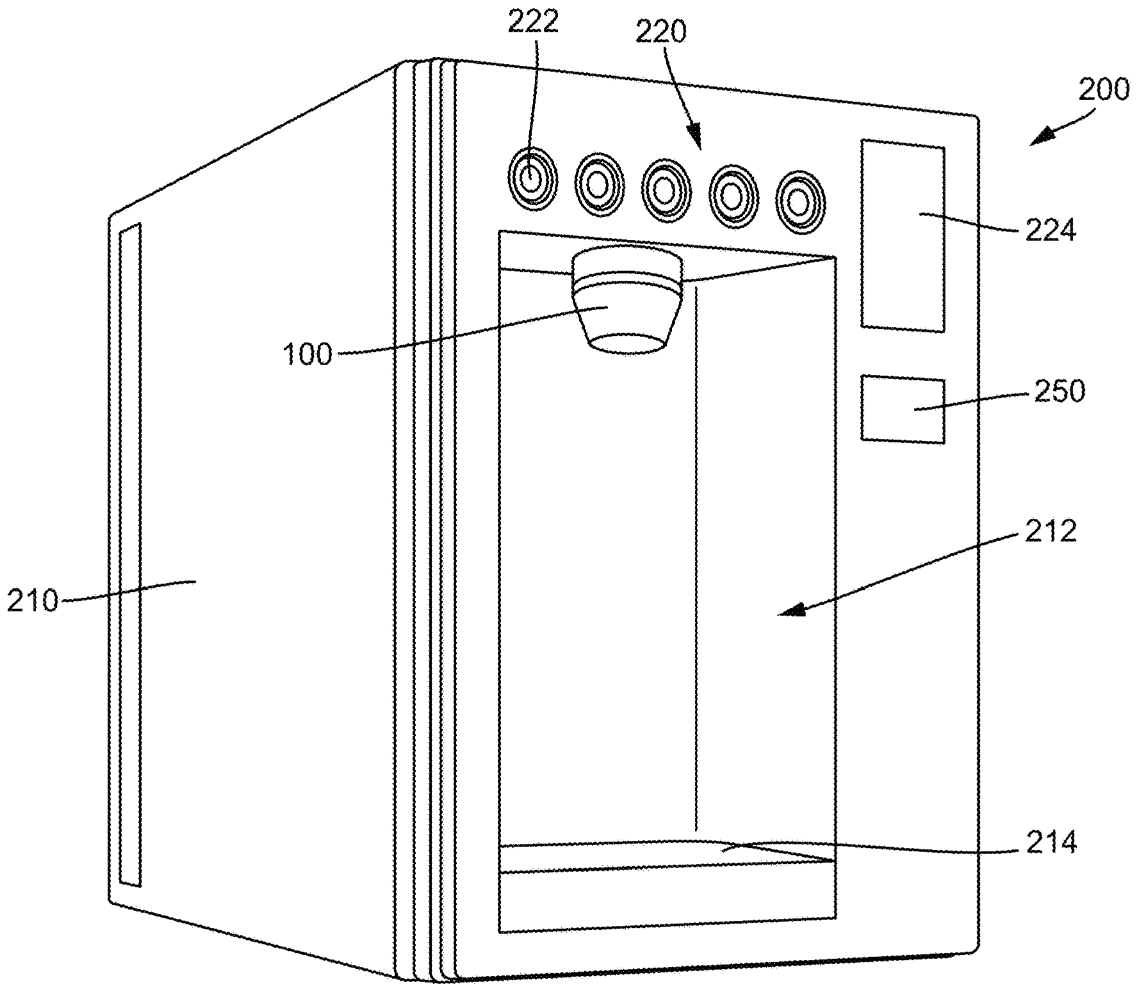
FIG. 9 shows a beverage dispensing having a beverage dispensing nozzle according to an embodiment.

In some embodiments, a beverage dispenser 200 may include a beverage dispensing nozzle 100 as described herein. As shown in FIG. 9, beverage dispenser 200 may include a housing 210 defining a beverage container receiving area 212 for receiving a container to collect a beverage dispensed from nozzle 100. Nozzle 100 may be disposed on housing 210 at an upper end of beverage container receiving area 212. A drip tray 214 may be arranged at a lower end of beverage container receiving area 212 to collect any excess liquid from nozzle 100. In some embodiments, housing 210 may enclose a source of base liquid, one or more sources of flavoring, or both. However, the source of base liquid, the source of flavoring, or both may be remote from beverage dispenser 200 so that beverage dispenser 200 may have a compact configuration. Nozzle 100 may be connected to the source of base liquid and the source of flavoring via conduits within housing 210.

Beverage dispenser 200 may further include a user interface 220 for receiving a user input. User interface 220 may include one or more actuators 222, such as buttons, dials, levers, switches, knobs, or the like for controlling operation of beverage dispenser 200. For example, each actuator 222 may correspond to a particular beverage to be dispensed, such as still water, sparkling water, hot water, alkaline water, or flavored water, among others. In some embodiments, beverage may continue to dispense until actuator 222 ceases to be actuated by the user (e.g., beverage dispenses while a button is pressed and stops dispensing when the button is released). In some embodiments, beverage may dispense a predetermined quantity of beverage upon actuation of an actuator 222. In some embodiments, user interface 220 may further include a display 224 for displaying information, such as instructions for operating the beverage dispenser. In some embodiments, display 224 may be a touch screen display such that the user may control operation of beverage dispenser 200 by touching or interacting with touch screen display. For example, the user may operate user interface 220 to input a beverage selection and to cause dispensing of the beverage, such as by operating a dispense button.

Beverage dispenser 200 may include a control unit 250 for controlling the beverage dispensing operation. Control unit 250 may be in communication with user interface 220 and further with one or more pumps for dispensing base liquid and flavoring from the sources of base liquid and flavoring. In operation, user input may be received by user interface 220 and transmitted to control unit 250 from user interface 220. Upon receipt of the user input, control unit 250 may cause a beverage to be dispensed from nozzle 100 (such as by actuating pumps) corresponding to the user input. Control unit 250 may have any of various configurations for carrying out the dispensing operation as described herein as will be understood by one of ordinary skill in the art. In some embodiments, control unit 250 may include one or more processors and a memory which may store executable instructions, such as a software program, for controlling the dispensing operation.

Figure 10:
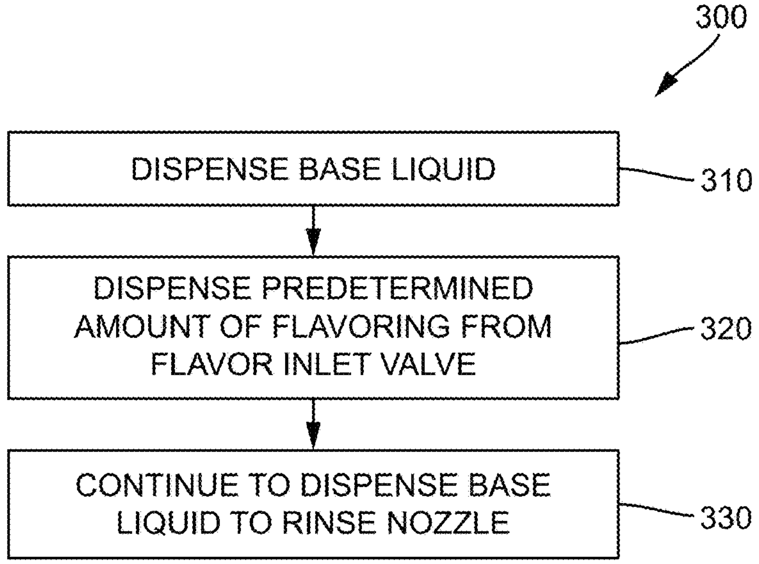
FIG. 10 shows an exemplary method for dispensing a beverage from a beverage dispensing nozzle according to an embodiment.

An exemplary method 300 of dispensing a beverage using a beverage dispensing nozzle as described herein is shown in FIG. 10. In operation of a beverage dispensing nozzle, a base liquid is dispensed through nozzle 310. While the base liquid is being dispensed, a predetermined quantity of flavoring is dispensed by the flavor inlet valve 320 into the housing. The flavoring is dispensed into the housing to begin combining with the base liquid as the base liquid flows through the housing. Once the predetermined quantity of flavoring is dispensed, the base liquid continues to dispense to rinse the nozzle 330. The base liquid may continue to dispense for a rinsing time, which may be in a range of 100 ms to 700 ms, 150 ms to 500 ms, or 200 ms to 300 ms. The total amount of base liquid dispensed is suitable to provide the desired dilution ratio of flavoring to base liquid. The timing of dispensing the base liquid and flavoring may be controlled by a control unit as described herein.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A beverage dispensing nozzle, comprising:

a housing having an upper end opposite a lower end and extending along a longitudinal axis;

a nozzle tip arranged at the lower end of the housing;

an inlet at the upper end of the housing that is configured to be placed in communication with a source of a base liquid;

a chamber within the housing and in communication with the inlet;

an aerator disposed in the upper end of the housing and in communication with the chamber, wherein the aerator comprises a top plate comprising a central apex at an upper end of the aerator and a first plurality of apertures, and a main plate arranged downstream of the top plate and having a second plurality of apertures configured to restrict a flow of the base liquid through the aerator and to retain a quantity of the base liquid on the top plate of the aerator to avoid backflow of air through the beverage dispensing nozzle;

wherein the lower end of the housing comprises an inner wall extending from the aerator to the nozzle tip having a constant diameter throughout with respect to the longitudinal axis;

a flavor inlet valve in communication with a source of a flavoring and that is arranged downstream of the aerator, wherein the flavor inlet valve extends inwardly into the housing from the inner wall and is configured to dispense the flavoring into the housing; and wherein no flavor inlet valve is arranged upstream or downstream of the flavor inlet valve, and wherein the flavor inlet valve extends inwardly from the inner wall to a greater extent than any portion of the inner wall downstream of the flavor inlet valve so as to inhibit the flavoring dispensed by the flavor inlet valve from contacting the inner wall.

2. The nozzle of claim 1, wherein the flavor inlet valve comprises a poppet valve.

3. The nozzle of claim 2, wherein the poppet valve comprises a poppet having a head that extends from the inner wall.

4. The nozzle of claim 1, wherein the flavor inlet valve is one of a plurality of flavor inlet valves.

5. The nozzle of claim 4, wherein the plurality of flavor inlet valves are arranged around a circumference of the housing in a plane transverse to the longitudinal axis of the housing.

6. The nozzle of claim 4, wherein the plurality of flavor inlet valves are arranged in a common plane.

7. The nozzle of claim 1, wherein the flavor inlet valve is configured to dispense the flavoring into the housing in a direction perpendicular to the longitudinal axis of the housing.

8. A beverage dispensing nozzle, comprising:

a housing having a cylindrical shape extending from an upper end to a lower end along a longitudinal axis, wherein the upper end comprises an inlet that is in communication with a source of a base liquid;

a nozzle tip arranged at the lower end of the housing for dispensing the base liquid and flavoring;

an aerator arranged within the upper end of the housing, wherein the aerator comprises a top plate having a first plurality of apertures, and a main plate arranged downstream of the top plate and having a second plurality of apertures configured to reduce a pressure of a flow of the base liquid through the aerator;

wherein the lower end of the housing comprises an inner wall extending from the aerator to the nozzle tip having a constant diameter throughout with respect to the longitudinal axis;

a flavor inlet valve configured to dispense a flavoring into the housing downstream of the aerator, wherein the flavor inlet valve extends inwardly into the housing from the inner wall; and wherein no flavor inlet valve is arranged upstream or downstream of the flavor inlet valve, and wherein the flavor inlet valve extends inwardly from the inner wall of the housing to a greater extent than any portion of the inner wall downstream of the flavor inlet valve in order to inhibit the flavoring dispensed by the flavor inlet valve from contacting the inner wall of the housing.

9. The nozzle of claim 8, wherein a dilution ratio of the flavoring to the base liquid is in a range of 1:100 to 1:900.

10. The nozzle of claim 8, wherein the top plate comprises a conical shape.

11. A beverage dispensing nozzle, comprising:

a housing having a cylindrical wall extending from an upper end to a lower end of the housing and extending along a longitudinal axis;

a nozzle tip arranged at the lower end of the housing for dispensing the base liquid and flavoring;

an inlet arranged at the upper end of the housing for receiving a flow of a base liquid;

an aerator arranged within the upper end of the housing and configured to reduce a pressure of a flow of the base liquid;

wherein the lower end of the housing comprises an inner wall extending from the aerator to the nozzle tip having a constant diameter throughout with respect to the longitudinal axis; and one or more flavor inlet valve arranged on the housing downstream of the aerator, wherein all of the one or more flavor inlet valves are arranged around a circumference of the housing in a plane transverse to the longitudinal axis of the housing, wherein the one or more flavor inlet valves each comprises a poppet having a head, wherein the head of the poppet extends from the inner wall of the housing into an interior volume of the housing to a greater extent than any portion of the inner wall downstream of the flavor inlet valve in order to inhibit flavoring dispensed by the flavor inlet valve from contacting the inner wall, and wherein the one or more flavor inlet valves are configured to be placed in communication with a source of flavoring and selectively dispense the flavoring into the housing.

12. The nozzle of claim 11, further comprising a chamber in communication with the inlet.

13. The nozzle of claim 12, wherein the aerator comprises a top plate configured to retain a quantity of the base liquid on the top plate to prevent backflow of air into the chamber.

14. The nozzle of claim 11, wherein the poppet comprises a biasing mechanism configured to bias the flavor inlet valve in a closed configuration.

15. The nozzle of claim 11, wherein the flavor inlet valve comprises a first section arranged parallel to the longitudinal axis of the housing and configured to be placed in communication with the source of the flavoring, and a second section connected to the housing such that the second section is perpendicular to the longitudinal axis of the housing.

16. The nozzle of claim 11, wherein the head of the poppet comprises a convex curvature.

17. The nozzle of claim 1, wherein a first diameter of the first plurality of apertures is greater than a second diameter of the second plurality of apertures.

18. The nozzle of claim 1, wherein the first plurality of apertures comprises a greater number of apertures than the second plurality of apertures.

19. The nozzle of claim 1, wherein the aerator further comprises a third plate arranged downstream of the main plate and comprising a third plurality of apertures.

20. The nozzle of claim 1, wherein the first plurality of apertures of the top plate extend in the longitudinal direction of the housing.

* * * * *